(12) United States Patent
Choi et al.

(10) Patent No.: US 6,741,579 B1
(45) Date of Patent: May 25, 2004

(54) DATA COMMUNICATION METHOD BETWEEN BASE STATION AND MOBILE TERMINAL IN MOBILE RADIO COMMUNICATION SYSTEM

(75) Inventors: Jin Ho Choi, Kyungki-do (KR); Chul Heum Yon, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/222,342

(22) Filed: Dec. 29, 1998

(30) Foreign Application Priority Data

Feb. 9, 1998 (KR) .............................................. 98-3728

(51) Int. Cl.[7] ................................................ H04B 7/212
(52) U.S. Cl. ..................... 370/337; 370/347; 455/447
(58) Field of Search ................................. 370/328, 329, 370/330, 335, 336, 337, 342, 345, 347, 441, 442, 468, 437, 478, 480, 498, 533, 535; 455/447–453, 422, 525

(56) References Cited

U.S. PATENT DOCUMENTS

| | | | | |
|---|---|---|---|---|
| 5,420,851 A | * | 5/1995 | Seshadri et al. ............... 370/29 |
| 5,768,254 A | * | 6/1998 | Papadopoulos et al. ...... 370/201 |
| 6,005,854 A | * | 12/1999 | Xu et al. ..................... 370/335 |
| 6,016,311 A | * | 1/2000 | Gilbert et al. .............. 379/280 |
| 6,137,787 A | * | 10/2000 | Chawla et al. .............. 370/337 |
| 6,289,006 B1 | * | 9/2001 | Schobl ........................ 370/330 |

* cited by examiner

Primary Examiner—Dang Ton
Assistant Examiner—Phuc Tran
(74) Attorney, Agent, or Firm—Fleshner & Kim, LLP

(57) ABSTRACT

A structure of a frame and an allocation method of data time slots in a wireless radio communication system. According to the time slot structure of a frame in down-link and up-link channels provided between a base station and a wireless terminal in the present invention, at least one macro-slot section is provided which comprises a static TDD section wherein at least one down-link slot and up-link slot are alternately and repeatedly arranged and a dynamic TDD section wherein the arrangement of the down-link slots and the up-link slots are varied in accordance with traffic amounts in each links for a predetermined time and the characteristic of a transmitted signal in each links.

31 Claims, 4 Drawing Sheets

DATA COMMUNICATION METHOD BETWEEN BASE STATION AND MOBILE TERMINAL IN MOBILE RADIO COMMUNICATION SYSTEM

BACKGROUND OF THE INVENTION

1. Field of the Invention

The present invention relates to a wireless radio communication system. In particular, the present invention relates to a data communication method between a base station and a wireless terminal in a radio communication system which can increase the transmission efficiency in case of bidirectionally transmitting data through a single channel between the base station and wireless terminal.

2. Description of the Related Art

Generally, the signal transmission system in a wireless radio communication system may be classified into a bidirectional transmission system and a unidirectional transmission system. The bidirectional transmission type communication system is applied to various type terminals such as wireless units for vehicles and cellular wireless units. The bidirectional transmission type wireless radio communication system is provided with a plurality of base stations serving as interfaces between the terminals in a predetermined number of cells. According to the bidirectional transmission system, a plurality of time slots each of which is composed of a predetermined number of bits (for example, 40 bits or symbols) are allocated to a transmission frame for transmitting data through a predetermined channel between the terminal and the base station, and the transmission of data, which is divided into slots, is bidirectionally performed at the same time. Here, the time slot means the time period during which a slot is transmitted. According to the present invention, the slot transmitted from the base station to the terminal is defined as a down-link slot, and the slot transmitted from the terminal to the base station is defined as an up-link slot.

According to the conventional system, in case that the information produced from a certain terminal or base station is transmitted bidirectionally, as shown in FIG. 1, the data frame tied in the unit of 40 bits is alternately and continuously transmitted in forward and backward directions during given slots D1, U1, D2, and U2. That is, the down-link slots and the up-link slots D1, U1, D2, and U2 are alternately and repeatedly transmitted at the same time.

The signal transmission system as described above is designed assuming that the amount of data, which is transmitted and received, between the originating side and the terminating side, is almost the same based on the wireless radio communication system for transmitting a voice signal, and nowadays, almost wireless radio communication systems use the transmission system as described above.

However, the radio information communication service merely providing a voice signal has been changed to the communication service for providing multimedia information such as a voice, video, and text information. Accordingly, the wireless radio communication system, which assumes that the ratio of the down-link slots to the up-link slots is almost "1", cannot effectively use the given frequency in the communication environment considering the multimedia information. For instance, in case that a data terminal receives data or video broadcasting signal utilizing Internet, the data is one-sidedly provided from the corresponding base station, and thus the down-link slots are used, but the up-link slots are not used on the given channel. This causes the use efficiency of the frequency resources to greatly deteriorate.

In order to solve the above problems, there has been proposed a data communication method using a time division duplex (TDD) system for differently allocating the down-link slots and the up-link slots when transmitting required information.

However, various technical problems have been produced in applying the data communication system using the TDD system to the cellular wireless radio communication system. For instance, if the number and the arrangement of the down-link and up-link slots are variably allocated due to an unbalanced amount of traffic, the corresponding base station may fail in random access, or the terminal may be not synchronized with the corresponding base station.

Also, if a terminal in use moves crossing the boundary between adjacent cells in case that the data communication method using the TDD system is applied to a code division multiple access (CDMA) wireless radio communication system, the slots in a slot section where the data communication method using the TDD system is applied may be used as the down-link and up-link slots different from one another for each cell, and thus the interference between the cells may be greatly increased.

SUMMARY OF THE INVENTION

Accordingly, the present invention is directed to a data communication method between a base station and a wireless terminal in a wireless radio communication system that substantially obviates one or more of the problems due to limitations and disadvantages of the related art.

An object of the present invention is to provide a data communication method between a base station and a wireless terminal in a wireless radio communication system which does not cause problems in random access by allocating in a frame at least one macro-slot section wherein a static TDD section, in which down-link slots and up-link slots are alternately and repeatedly arranged, and a dynamic TDD section, in which the number and the arrangement of the down-link slots and the up-link slots can be varied, are simultaneously allocated, and which can increase the efficiency of the frequency resources by acquiring the synchronization between the terminal and the corresponding base station.

It is another object of the present invention is to provide a data communication method between a base station and a wireless terminal in a wireless radio communication system which can greatly reduces the interference between cells generated during performing a handoff as the terminal in use moves crossing the boundary of the adjacent cells in case that the time slots in the above-described wireless radio communication system are applied to a CDMA type wireless radio communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the bidirectional data transmission method between a base station and a wireless terminal in a wireless radio communication system for allocating down-link channels and up-link channels to different time slots having the same frequency band, respectively, the bidirectional data transmission method comprises the steps of varying a channel allocation pattern of the down-link channels and the up-link channels in accordance with a characteristic of a traffic transmitted through the down-link and up-link channels.

In another aspect of the present invention, there is provided a time slot allocating method between a base station and a wireless terminal in a wireless radio communication system for allocating down-link channels and up-link channels to different time slots having the same frequency band, respectively, the time slot allocating method comprising the steps of providing a macro-slot section composed of a plurality of time slots wherein the down-link channels and the up-link channels are allocated in accordance with a specified pattern, and repeatedly applying the allocated pattern for a predetermined number of macro slots.

In still another aspect of the present invention, there is provided a cellular telephone system for allocating down-link channels and up-link channels to different time slots of a same transmission frame between a base station and a wireless terminal, wherein positions of the respective time slots allocated to the down-link channels and the up-link channels between the base station and the radio terminal are fixed in a partial area of a cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The structure and the allocating method of the data time slot used for the data transmission between a wireless terminal and a base station according to an embodiment of the present invention will be explained with reference to the accompanying drawings.

Figure 1:
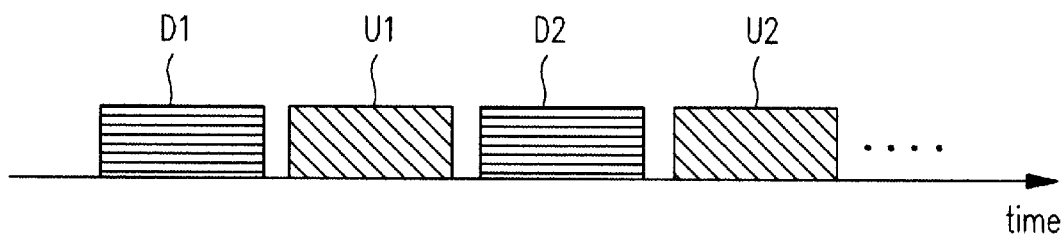
FIG. 1 is a block diagram illustrating the allocated down-link and up-link slots during the bidirectional data communication in a conventional wireless radio communication system.
Figure 2:
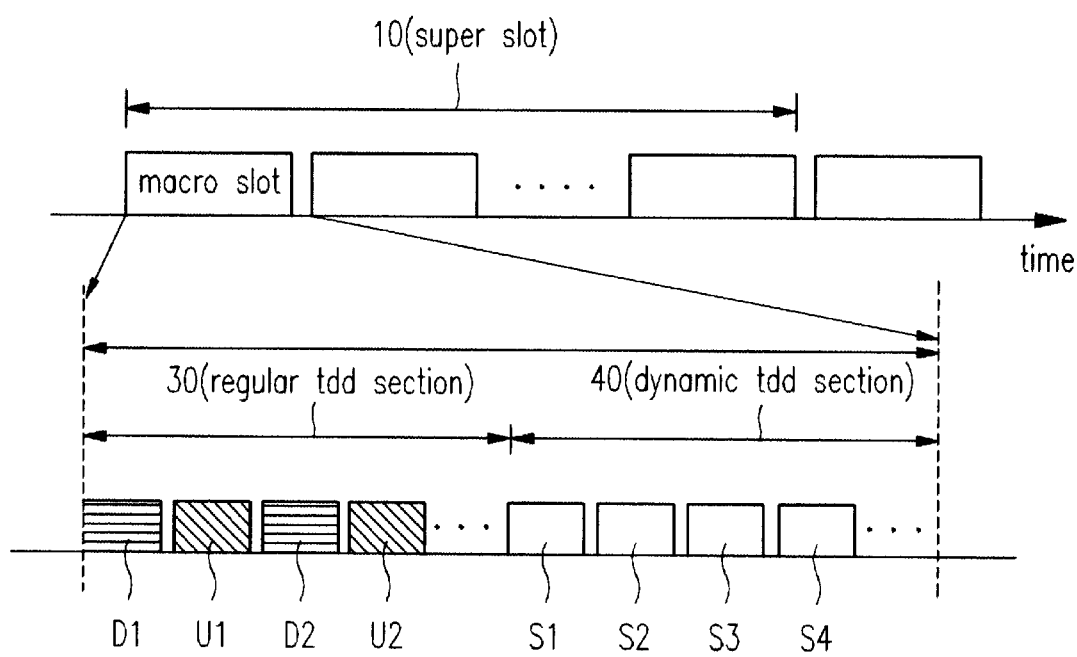
FIG. 2 is a block diagram illustrating the arrangement of the down-link and up-link slots during the bidirectional data communication in a wireless radio communication system according to the present invention.

FIG. 2 is a block diagram illustrating the arrangement of the down-link and up-link slots according to the present invention.

Referring to FIG. 2, according to the time slot structure of the present invention, a frame is divided into the predetermined number of super-slot sections 10. A super-slot section 10 comprises at least one macro slot 20 which is composed of a static TDD section 30 wherein at least one down-link slot D1 and up-link slot U1 are alternately and repeatedly arranged and a dynamic TDD section 40 wherein the number and the arrangement of the down-link slots D1 and the up-link slots U1 can be varied in accordance with the signal characteristics of a transmitted signal such as the amount of traffic, delay time, and speech quality.

Here, the number of the down-link and up-link slots D1, U1, D2, and U2 allocated in the static TDD section 30 may be varied according to the signal characteristics, but the down-link and up-link slots D1, U1, D2, and U2 should be allocated and arranged alternately and repeatedly. By contrast, the time slots S1 to S4 in the dynamic TDD section 40 are allocated with the rate of the number of the down-link slots to that of the up-link slots varied in accordance with the used frequency environment, interference between adjacent base stations, kind of data in the base station cell, or geographical environment. For instance, in case that the computed traffic rate of information transmitted through the down-link slots to that transmitted through the up-link slots in a certain section was found to be 8:2, 80% of the whole slots in the dynamic TDD section 40 is allocated as the down-link slots, and 20% thereof is allocated as the up-link slots.

In the embodiment of the present invention, considering the characteristics of the transmitted signal, the rate of the number of slots in the static TDD section 30 to that in the dynamic TDD section 40 is varied for each super-slot section 10, and the rate of the number of the down-link slots to that of the up-link slots and their arrangement in the dynamic TDD section 40 are changed. Specifically, the rate of the number of the slots allocated in the static TDD section 30 to that allocated in the dynamic TDD section 40 is maintained for one super-slot section 10, and for a next super-slot section, the rate of the number of the slots in the static TDD section 30 to that in the dynamic TDD section 40 is re-allocated in accordance with the computed result of the amount of data and the signal characteristics.

In one embodiment of the present invention, in order to perform the above-described function, at least one macro-slot section 20 is provided in one super-slot section 10. The respective slots may by used as the down-link and up-link slots, respectively, in the macro-slot section 20, and the rate of:the down-link slots to the up-link slots may be varied according to the amount and the characteristics of the signal transmitted through the down-link and up-link slots. If the allocation of the down-link and up-link slots is varied for each macro-slot 20, the corresponding information is transmitted to the corresponding wireless terminal to produce an overhead. At this time, since the structure of the macro-slot section 20 is not changed for a super-slot section 10, production of such an overhead can be reduced.

As already described in the prior art technique, application of the slots allocated in the dynamic TDD section to the cellular wireless telephone system may cause problems in synchronization and random access, while application thereof to the CDMA wireless telephone system may cause the generation of interference between cells when a handoff is performed as the wireless terminal moves between the adjacent cells. According to the embodiment of the present invention, such problems generated in the prior art technique can be solved by applying to the cellular wireless radio communication system the macro-slot section 20 in which the dynamic TDD section 40 and the static TDD section 30 are simultaneously allocated.

Hereinafter, the synchronization of the wireless terminal, random access method, slot allocation method in each direction in the dynamic TDD section, and interference-reducing operation during handover between the adjacent cells according to one embodiment of the present invention will be explained with reference to FIGS. 2 to 5.

Synchronization

In transmitting data through an allocated channel, the wireless terminal and the base station in the wireless radio communication system first set the channel, and then transmit and receive the information in the unit of a time slot. At this time, in case of the down-link transmission, the wireless terminal receives the signal transmitted from the base station, and is synchronized with the corresponding base station.

Referring to FIG. 2, the synchronization of a certain wireless unit with the corresponding base station according to the embodiment of the present invention is performed using the static TDD section 30 of the macro slot 20 wherein the static TDD section 30 and the dynamic TDD section 40 are simultaneously allocated.

Figure 3:
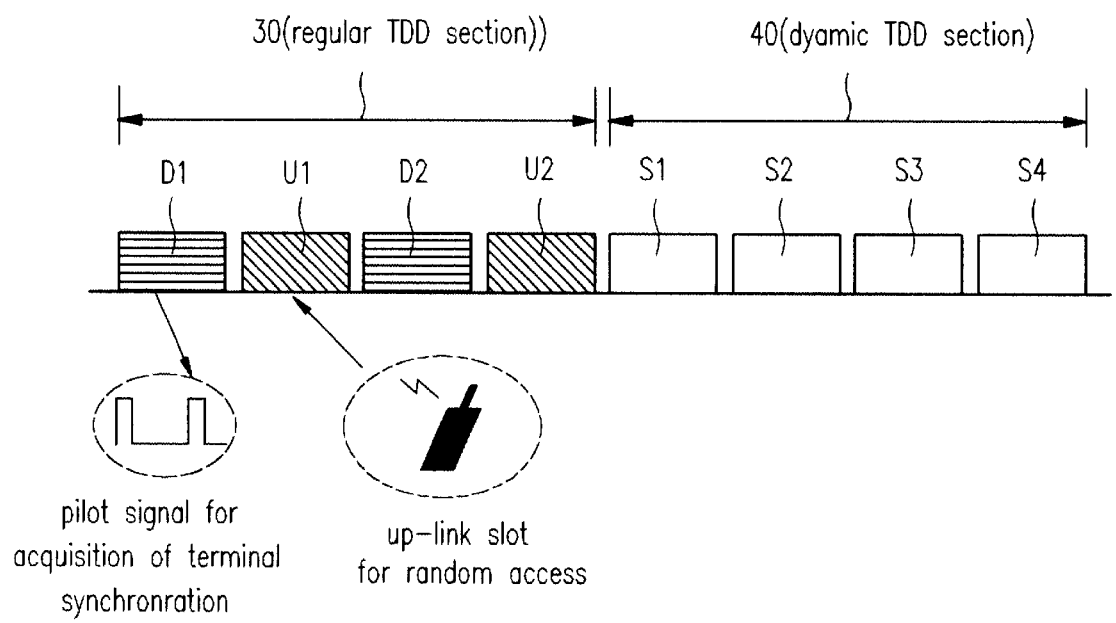
FIG. 3 is a block diagram illustrating the arrangement state of the down-link slot for transmitting a pilot signal for acquisition of the terminal synchronization and the up-link slot for random access in the macro-slot section of FIG. 2.

Specifically, the role of the slots D1, U1, D2, and U2 in the static TDD section 30, in which the down-link and up-link slots D1, U1, D2, and U2 are alternately and repeatedly allocated, is to bidirectionally transmit the required information, and according to the embodiment of the present invention, they are also used for acquiring the synchronization of the up-link slots. Referring to FIG. 3, if the base station carries a pilot signal on at least one down-link slot D1 in the static TDD section 30, the wireless terminal detects this pilot signal carried on the down-link slot D1 or D2 and synchronizes itself with a synchronous signal provided from the base station.

Random Access

Referring to FIG. 3, since the down-link and up-link slots D1, U1, D2, and U2 are alternately allocated in the static TDD section, the wireless terminal can detect when the up-link slots U1 and U2 are provided. In the embodiment of the present invention, the random access is performed using the up-link slots U1 and U2 in the static TDD section 30. Accordingly, no more problem will occur due to the failure of the random access even though the number and the arrangement of the down-link and up-link slots are variably allocated in the dynamic TDD section 40 if the traffic becomes unbalanced due to the signal characteristics.

Slot Allocation in the Dynamic TDD Section

Practically, in the dynamic TDD section 40, the number and the arrangement of the up-link and down-link slots S1 to S4 can be variably allocated in accordance with the signal characteristics such as the traffic amount, delay time, and speech quality of the signal. Thus, the originating wireless terminal should inform to the base station the traffic amount (or bandwidth) required by itself when attempting the communications. For instance, the service option may set a voice service mode when the call is attempted only by the wireless terminal, while it may set a data service mode when the wireless terminal and the radio data terminal are connected together. At this time, if the originating wireless terminal requests an unacceptable bandwidth, the base station can refuse the connection thereto.

Figure 4A:
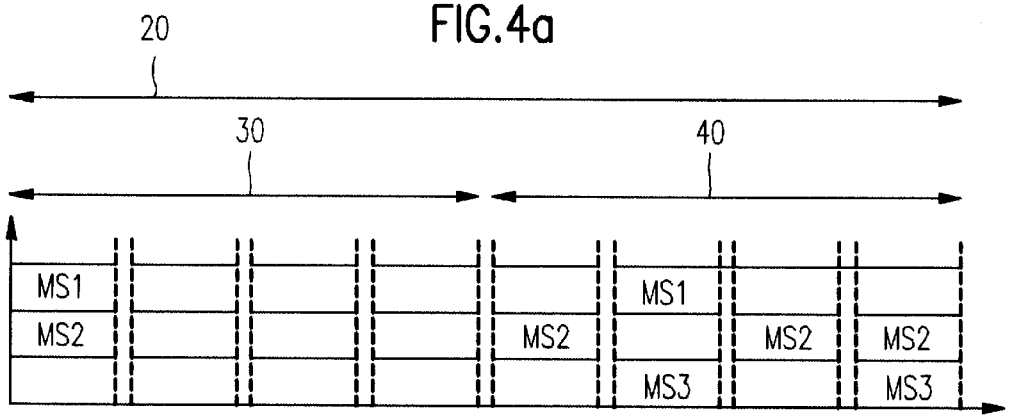
FIGS. 4a to 4e are block diagrams illustrating the structure of the allocated down-link and up-link slots in accordance with the amount of information transmitted from a user in case that three wireless terminals are located in a cell according to an embodiment of the present invention.

FIG. 4a is a block diagram illustrating the arrangement of the channel allocation in accordance with the traffic amount of the wireless terminal in case that three wireless terminals MS1, MS2, and MS3 are located in a cell in a CDMA wireless radio communication system according to an embodiment of the present invention. FIGS. 4b to 4e are block diagram are block diagrams illustrating the structure of the allocated down-link and up-link slots in the channels allocated to the respective wireless terminals MS1, MS2, and MS3.

Figure 4B:
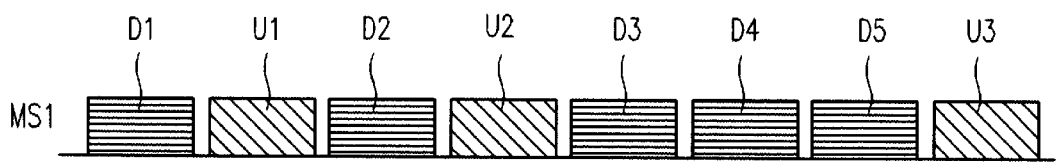
Figure 4C:
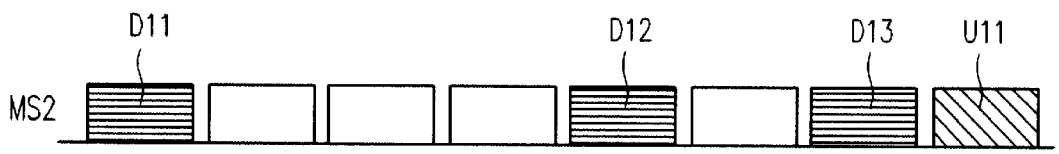
Figure 4D:
Figure 4E:
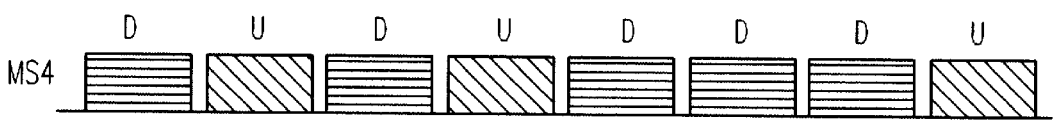

Referring to FIGS. 4a to 4e, it is assumed that if a macro slot 20 is composed of eight slots, the first wireless terminal MS1 uses five down-link slots D1 to D5 and three up-link slots U1 to U3 as shown in FIG. 4b, the second wireless terminal MS2 uses three down-link slots D11 to D13 and one up-link slot U1 as shown in FIG. 4c, and the third wireless terminal MS3 uses one down-link slot D21 and one up-link slot U21 as shown in FIG. 4d. In this case, the respective down-link and up-link slots are arranged and allocated in the macro slot 20 of the cell as shown in FIG. 4e.

Allocation in the macro-slot section 20 =[D U D U D D D U] Here, D and U denote a down-link slot and a up-link slot, respectively.

Specifically, two down-link slots and two up-link slots D1, U1, D2, and U2 are alternately allocated in the static TDD section 30, and three down-link slots D3 to D5 and one up-link slot U3 are allocated in turn in the dynamic TDD section 40. Accordingly, the collision between the cells does not occur even when the handoff is performed among the respective wireless terminals MS1 to MS3.

Handover and Interference Control

In the CDMA wireless radio communication system using a cellular network, the wireless terminal in use should perform a handoff for changing the corresponding base station for providing a communication control signal thereto of the wireless terminal in use moves between the adjacent cells. At this time, the set traffic channel should be continuously maintained. However, since the slots in the dynamic TDD section 40 may be allocated in the different directions with respect to the respective cells, the collision between the used frequencies may occur during the movement of the wireless unit to another cell. Though it is assumed that the respective adjacent cells are synchronized with their corresponding base stations in the embodiment of the present invention, the same frequency is used in the adjacent cells in the CDMA type wireless radio communication system, and thus the interference between the dynamic TDD sections 40 of the wireless radio terminals is apt to be greatly increased during the movement of the wireless terminals crossing the boundary of the adjacent cells.

Figure 5:
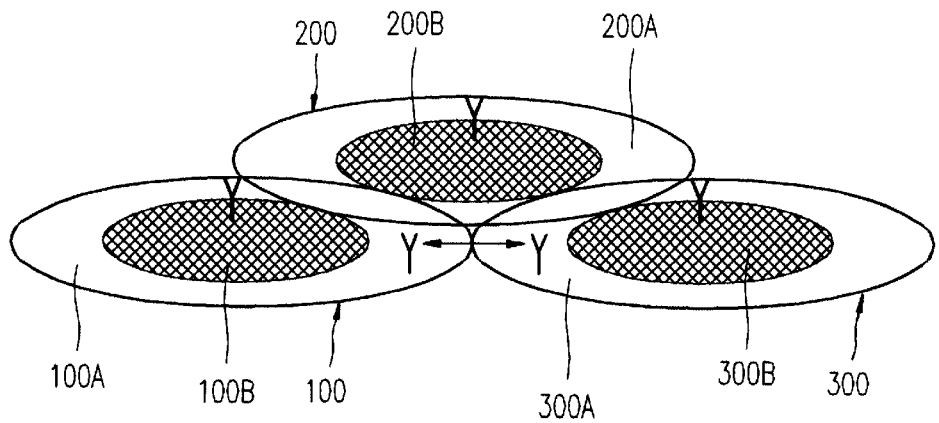
FIG. 5 is a view explaining the interference generated during a handoff between adjacent cells in a CDMA wireless radio communication system according to another embodiment of the present invention.

According to another embodiment of the present invention, as shown in FIG. 5, one cell 100 in the CDMA wireless radio communication system is divided into an outer cell 100A and an inner cell 100B. Here, the size of the inner or outer cell 100A or 100B can be properly designed considering the cell shape and the topography.

Figure 6A:
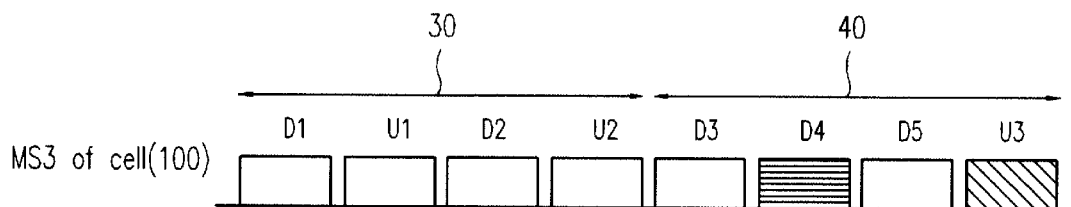
FIGS. 6a to 6c are block diagrams explaining the reduction of the interference generated when a wireless terminal in use in a cell of FIG. 5 moves into another cell.
Figure 6B:
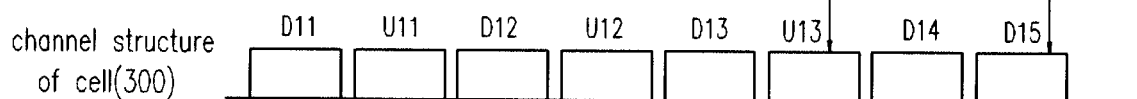
Figure 6C:
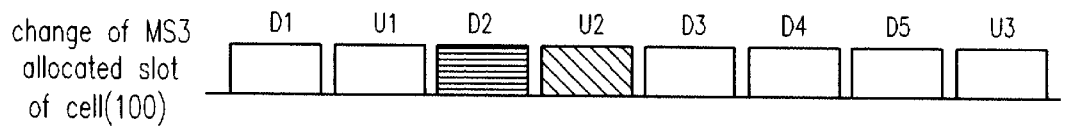

For instance, as shown in FIG. 5, if a wireless unit MS3 in use having the slot structure of FIG. 6a in the inner cell of the cell 100 moves into the region of another cell 300 wherein another wireless terminal in use exists, utilizing the slot as shown in FIG. 6b in a state that various cells 100, 200, and 300 are adjacent with one another as shown in FIG. 5, the collision may occur as shown in FIGS. 6a and 6b since the directions of the slots in the dynamic TDD section 40 are different from one another. At this time, as shown in FIG. 6c, the wireless terminal MS3 in the cell 100 adapts itself to the time slot used between the wireless terminal of the adjacent cell 300 and the base station, and transmits data. Specifically, the wireless terminal MS3 transmits data to the corresponding base station of the adjacent cell 300 only by using the static TDD section 30 for an initial predetermined time.

Accordingly, if the interference becomes great by the movement of the wireless terminal MS3 in the cell 100 to the outer cell 100A of the cell 100, the corresponding base station controls the slot allocation to be limited in the range of the static TDD section 30, and thus the interference generated during the handover can be greatly suppressed.

According to the present invention as described above, in providing the next-generation wireless radio communication service considering the multimedia data such as a voice signal, video signal, text information, etc., the wireless terminal or the base station allocates and moves a transmission frame including a macro-slot section wherein a static TDD section, in which down-link slots and up-link slots are alternately and repeatedly arranged, and a dynamic TDD section, wherein the number and the arrangement of the down-link and up-link slots can be varied, are simultaneously allocated in accordance with the amount and the characteristics of data transmitted from the wireless terminal or the base station through the down-link and up-link slots, so that the synchronization between the terminal and the corresponding base station and can be acquired, problems in random access can be solved, and the efficiency of the frequency resources can be greatly increased.

Also, in case of applying the present invention to the CDMA type wireless radio communication system, the interference caused by the handoff generated when the wireless terminal in use becomes adjacent to another cell can be greatly suppressed.

While the present invention has been described and illustrated with reference to the preferred embodiments thereof, it will be apparent to those skilled in the art that various modifications and variations can be made therein without departing from the spirit and scope of the invention.

What is claimed is:

1. A bidirectional data transmission method between a base station and a wireless terminal in a wireless radio communication system for allocating down-link channels and up-link channels to different time slots, respectively, the bidirectional data transmission method comprising:
   transmitting bidirectional data between the base station and the wireless terminal in transmission frames each of which includes a static section and a dynamic section, said static section including a fixed pattern of up-link and down-link time slots and said dynamic section having a variable pattern of up-link and down-link time slots, said transmitting step including:
   varying the pattern of the down-link and the up-link time slots in said dynamic section in accordance with a characteristic of traffic transmitted between the base station and the wireless terminal.

2. The bidirectional data transmission method of claim 1, wherein the up-link and down-link time slots in said dynamic section are repeatedly arranged for a predetermined number of time slots.

3. The bidirectional data transmission method of claim 1, wherein a number of time slots in the dynamic section is determined in accordance with a number of time slots in the static section.

4. The bidirectional data transmission method of claim 1, wherein the characteristic of the traffic is an amount of information transmitted through the respective down-link and up-link channels.

5. The bidirectional data transmission method of claim 1, wherein the characteristic of the traffic is interference from adjacent cells or kinds of transmitted data.

6. The bidirectional data transmission method of claim 1, wherein the predetermined pattern of time slots in the static section is fixed regardless of the characteristic of the traffic.

7. The bidirectional data transmission method of claim 6, wherein the pattern of time slots in the static section is repeated for a predetermined number of time slots.

8. The bidirectional data transmission method of claim 7, wherein a number of time slots in the dynamic section is determined in accordance with a number of time slots in the static section.

9. The bidirectional data transmission method of claim 6, wherein the time slots in the static section are arranged in such a manner that down-link time slots and up-link time slots are alternately allocated.

10. The bidirectional data transmission method of claim 6, wherein at least one of the transmission frames includes a pilot signal a down-link slot in the static section, and wherein the wireless terminal is synchronized with the base station by the pilot signal.

11. The bidirectional data transmission method of claim 6, wherein the time slots in the static section are arranged for providing random access of the wireless terminal.

12. A time slot allocating method between a base station and a wireless terminal in a wireless communication system for allocating down-link channels and up-link channels to different time slots, respectively, the time slot allocating method comprising:
   providing a macro-slot section which includes a static section and a dynamic section, said dynamic section including a plurality of time slots wherein the down-link channels and the up-link channels are allocated in accordance with a specified pattern; and
   repeatedly applying the specified pattern for a predetermined number of macro slots.

13. The time slot allocating method of claim 12, wherein the specified pattern is determined in accordance with a characteristic of traffic transmitted through the down-link channels and the up-link channels.

14. The time slot allocating method of claim 13, wherein the characteristic of the traffic is an amount of information transmitted through the respective down-link and up-link channels.

15. The time slot allocating method of claim 13, wherein the characteristic of the traffic is the characteristic of the traffic for a previous macro slot.

16. A cellular telephone system for allocating down-link channels and up-link channels to different time slots in a same transmission frame between a base station and a wireless terminal, wherein the transmission frame includes a static section and a dynamic section carrying bidirectional data, wherein positions of the time slots allocated to the down-link channels and the up-link channels are fixed in the static section, and wherein positions of the time slots allocated to the down-link channels and the up-link channels in the dynamic section depend upon a characteristic of traffic between the base station and the wireless terminal.

17. The cellular telephone system of claim 16, wherein the positions of the time slots allocated to the down-link and the up-link channels in the dynamic section are varied.

18. The cellular telephone system of claim 16, wherein the static section is arranged at an outer part of the cell.

19. The cellular telephone system of claim 16, wherein the transmission frame includes an area in which degree of interferences caused by signals from adjacent cells is greater than a specified threshold value.

20. The cellular telephone system of claim 16, wherein the dynamic section is an area for handover to an adjacent cell.

21. A bidirectional data transmission method, comprising:
    allocating a first portion of a time division duplexing (TDD) frame into a static TDD section, having a fixed assignment of time slots for a first prescribed time period, that communicates payload traffic;
    allocating a second portion of the TDD frame into a dynamic TDD section, having a fixed assignment of time slots for a second prescribed time period, that communicates payload traffic;
    assigning a first number of the time slots within the dynamic TDD section as uplink time slots; and
    assigning a second number of the time slots within the dynamic TDD section as downlink time slots, wherein
    the static TDD has at least one uplink time slot and at least one downlink time slot and the at least one uplink and downlink time slots are fixedly sequenced within the static TDD section for the first prescribed time period.

22. The method of claim 21, wherein a macro slot within the TDD frame comprises the first and second portions of the TDD frame.

23. The method of claim 22, wherein the first prescribed time period is substantially equal to the combined period of a plurality of macro slot periods.

24. The method of claim 22, wherein the first prescribed time period is substantially equal to a super slot period of the TDD frame, which comprises a plurality of macro slots.

25. The method of claim 22, wherein the first prescribed time period and the second prescribed time period define a super slot period.

26. The method of claim 21, further comprising varying the number of uplink and downlink time slots allocated to the static TDD section, during each of a plurality of consecutive first prescribed time periods, in accordance with a characteristic of the payload traffic.

27. The method of claim 21, further comprising varying the number of uplink and downlink time slots allocated to the dynamic TDD section, during each of a plurality of consecutive second prescribed time periods, in accordance with a characteristic of the payload traffic.

28. The method of claim 27, further comprising varying the number of uplink and downlink time slots allocated to the dynamic TDD section, during each of a plurality of consecutive second prescribed time periods, in accordance with a characteristic of the payload traffic.

29. The method of claim 21, wherein the at least one uplink and downlink time slots are alternately sequenced within the static TDD section.

30. A bidirectional data structure for communicating payload traffic between communication devices, comprising:
    a static TDD portion of a time division duplexing (TDD) frame, having a fixed assignment of time slots for a first prescribed time period, that communicates the payload traffic;
    a dynamic TDD portion of the TDD frame, having a fixed assignment of time slots for a second prescribed time period, that communicates the payload traffic;
    a first number of the time slots within the dynamic TDD section assigned as uplink time slots; and
    a second number of the time slots within the dynamic TDD section assigned as downlink time slots, wherein
    the static TDD has at least one uplink time slot and at least one downlink time slot and the at least one uplink and downlink time slots are fixedly sequenced within the static TDD section for the first prescribed time period.

31. The data structure of claim 30, wherein:
    the at least one uplink and downlink time slots are alternately sequenced within the static TDD section; and
    the first prescribed time period is longer than the second prescribed time period.

* * * * *